United States Patent [19]

Sakai et al.

[11] Patent Number: 4,748,605
[45] Date of Patent: May 31, 1988

[54] BIAS-MAGNETIC-FIELD GENERATING APPARATUS IN MAGNETO-OPTICAL INFORMATION WRITING AND ERASING SYSTEM

[75] Inventors: Mitsugu Sakai; Shozi Yoshikawa, both of Hachioji, Japan

[73] Assignee: Olympus Optical Company Limited, Tokyo, Japan

[21] Appl. No.: 780,662

[22] Filed: Sep. 26, 1985

[30] Foreign Application Priority Data

Sep. 28, 1984 [JP] Japan .................. 59-145905[U]

[51] Int. Cl.$^4$ .................. G11B 5/02; G11B 11/00
[52] U.S. Cl. .................. 369/13; 360/59; 360/66
[58] Field of Search .......... 330/146, 189, 272; 360/59, 114; 365/121, 122; 369/13

[56] References Cited

U.S. PATENT DOCUMENTS 3,778,791 12/1973 Lewicki et al. .................. 365/122
4,410,277 8/1983 Yamamoto et al. .................. 360/114
4,539,662 9/1985 Hatano et al. .................. 369/13
4,586,001 4/1986 Pye .................. 330/146
4,670,865 6/1987 Hatano .................. 365/122

Primary Examiner—Raymond F. Cardillo
Assistant Examiner—James E. Tomassini
Attorney, Agent, or Firm—Bruce L. Adams; Van C. Wilks

[57] ABSTRACT

A magneto-optical information system writes and erases information on and from a magneto-optical information recording medium under application of a bias-magnetic-field to the recording medium according to writing and erasing command signals. A differential amplifying circuit differentially processes the writing and erasing command signals to produce a differential output signal, and a constant current power amplifying circuit produces a stable drive current according to the differential output signal. A bias-magnetic-field generating coil is driven by the stable drive current so that a stable bias-magnetic-field is applied to the information recording medium according to the differential output signal.

6 Claims, 2 Drawing Sheets

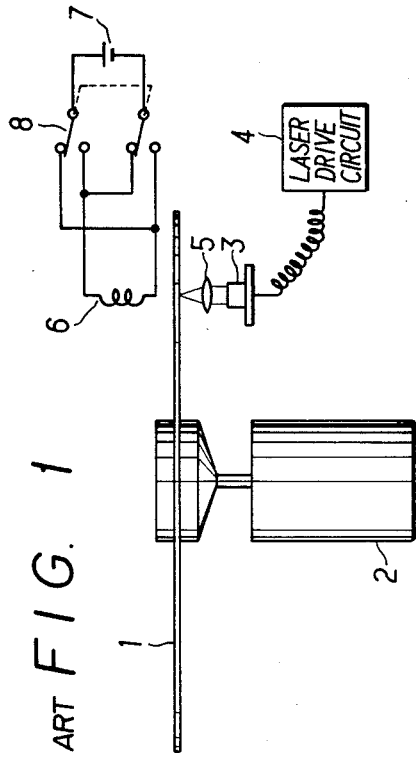
PRIOR ART FIG. 1
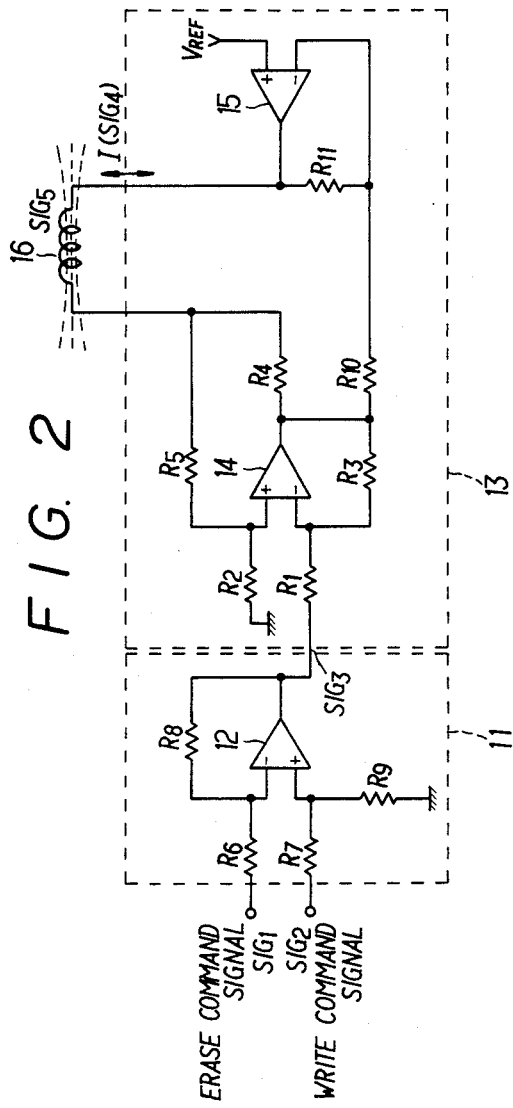
FIG. 2

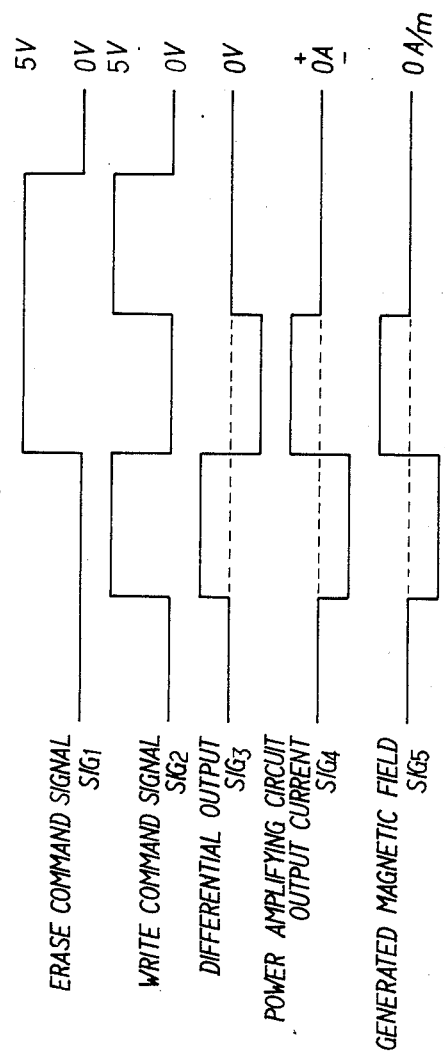

BIAS-MAGNETIC-FIELD GENERATING APPARATUS IN MAGNETO-OPTICAL INFORMATION WRITING AND ERASING SYSTEM

BACKGROUND OF THE INVENTION

This invention relates to a bias-magnetic-field generating method and apparatus for magneto-optical memory system which records, reproduces and erases information on a recording medium made of a magneto-optical recording material.

It has previously been known to provide a magneto-optical memory system which records, reproduces and erases information on a magneto-optical information storing medium such as a magneto-optical disc by way of the magneto-optical effect.

In the memory system of this type, points on a magneto-optical disc may be heated by laser beam irradiations in the presence of a bias-magnetic-field, and information is recorded or erased according to a altering direction of the bias-magnetic-field applied to the disc.

One of the magneto-optical memory system in the prior art is shown in FIG. 1. A magneto-optical disc 1 is placed on a turn table mounted on a spindle motor 2. A laser diode 3 which is connected to a drive circuit 4 emits a laser beam. The laser beam irradiates a point of a magnetic film on the disc 1 under the focus control by means of an objective lens 5. Apart from the disc 1, a coil 6 is placed on the opposite side of the beam-irradiated face of the disc 1. The coil 6 is connected to a coil drive circuit 7 via a switch 8, and generates the bias-magnetic-field.

In this system, information is recorded on the rotating disc 1 in the following procedure hereinafter decribed.

In the initial state, no information is recorded on the disc 1 and the magnetic film on the disc 1 is uniformly magnetized in one direction, for instance, upward with respect to the disc 1. The laser diode 3 emits the laser beam in the pulsive ON-and-OFF mode by means of the drive circuit 4 depending on the information to be recorded on the disc 1. The magnetic film, which is irradiated by the focused laser beam, is heated at a spot where the magnetic phase of the film is changed from the initial ferromagnetic phase to the para-magnetic phase when the temperature exceeds a curie temperature. Namely, the magnetic film on the disc 1 loses its initial spontaneous magnetization at the spot. On the other hand, since the disc 1 is rotating, the heated spot is moved away from the beam-irradiating position, and the spot is cooled and recovers its ferromagnetic phase in the presence of the bias magnetic-field. While the bias-magnetic-field is generated by the coil 6 in the direction selected by the switch 8, e.g. downward relative to the disc 1, the ferromagnetic phase in the spot is oriented downward. Thus the information of "1" or "0" is recorded onto the disc 1 at the spontaneous magnetized spot, called "pit", depending on the direction of the applied bias-magnetic-field.

In the case of the information erasing, following procedure similar to the recording process is performed as hereinafter described.

The laser diode 3, which is driven by the drive circuit 4, emits laser beam and irradiates the rotating disc 1. Bias-magnetic-field, a direction of which is selected by the switch 8, for instance, upward relative to the disc 1, is also applied to the disc 1. Thus the magnetic film storing the recorded information is heated by the laser beam irradiation and then cooled in the presence of said bias-magnetic-field. Therefore, the film loses its spontaneous magnetization of the recorded "pit" and obtains upwardly oriented spontaneous magnetization same as the initial state. Consequently, the recorded information on the magnetic film of the disc 1 is erased by means of the laser beam and the accompanied bias-magnetic-field.

However, the magneto-optical memory system in the prior art has its own problems as follows. In the prior art system, the coil 6 wastes a large amount of electric power, for example more than 1 watt, to produce enough bias-magnetic-field strength for the information recording or erasing. This energy dissipation also raises the coil temperature and the electric resistance of the coil winding is increased. The increase in the winding resistance becomes remarkable when the coil is driven in long-time-lasting operation. Consequently, this increase in coil resistance reduces a current flowing through the coil so that the bias-magnetic-field strength becomes decreased. Therefore, inappropriate information recording or erasing is caused by the insufficient bias-magnetic-field strength.

To solve the above described shortcoming, a permanent magnet is proposed to replace the coil. However, this causes another problem in the memory system. Namely, a complicated mechanism must be installed for altering the direction of the bias-magnetic-field for example.

On the other hand, the switch 8 for altering the direction of the bias-magnetic-field in the prior art causes another problem as follows. Generally, the switch 8 comprises a field polarity selecting circuit with four transistors in which two transistors work as a current source driver and other two transistors work as a current sink source driver for altering the coil current. When a command signal, e.g. write command or erase command signal, is supplied to the polarity selecting circuit, two transistors (one for the current source and another for the current sink) are selected and suitable bias-magnetic-field is applied to the disc by means of the energized coil. Consequently, a complicated polarity selecting circuit with four transistors must be installed in the memory system in the prior art.

SUMMARY OF THE INVENTION

It is an object of the present invention to overcome above described shortcomings and to provide an improved bias-magnetic-field generating method and apparatus for a magneto-optical memory system which can generate a stable magnetic field even in long lasting recording or erasing operation in a simple electric circuit.

Therefore, according to the present invention, there is provided a bias-magnetic-field generating system comprising differential amplifying circuit means which is provided with a write command signal and a erase command signal, current stabilizing power amplifying circuit means which is provided with an output signal from the differential amplifier, and a bias-magnetic-field generating coil which is driven by the current stabilizing power amplifier so that a stable bias-magnetic-field is applied to a magneto-optical disc medium in the magneto-optical memory system.

BRIEF DESCRIPTION OF THE DRAWINGS

The invention will now be described with reference to the accompanying drawings, in which:

FIG. 1 is a schematic presentation of a magneto-optical memory system in the prior art;

FIG. 2 is a circuit diagram showing a preferred bias-field generating system of the invention; and FIG. 3 is a time chart for explaining the operation of the invention.

DESCRIPTION OF THE PREFERRED EMBODIMENT

As previously described, this invention relates to a magneto-optical information writing and erasing apparatus with an improved bias-magnetic-field generating apparatus.

FIG. 2 shows the circuit diagram of the bias-magnetic-field generating circuit as a preferred embodiment of this invention. Differential amplifying circuit means 11 with inputs for an erase command signal (SIG1) and a write command signal (SIG2) comprises an operational amplifier 12 with resisters R6, R7, R8 and R9. Current stabilizing power amplifying circuit means 13, which received a differential output signal (SIG3) from the differential amplifying circuit means 11, comprises a bridge type amplifying circuit and provides a drive current output signal (SIG4) to a coil 16. The coil 16 supplies a bias-magnetic-field (SIG5) to a magneto-optical information storing medium or disc (not shown). In the differential amplifying circuit 11, the operational amplifier 12 receives the erase command signal (SIG1) at the negative input thereof via the resister R6, and receives the write command signal (SIG2) at the positive input thereof via the resister R7 connected to the resister R9 to differentially process the erase command signal (SIG1) with the write command signal (SIG2) to produce the differential output signal (SIG3). Resister R8 works as the feed-back resister. In the current stabilizing power amplifying circuit 13, the operational amplifier 14 receives the output signal (SIG3) at the negative input thereof via the resister R1. To the positive input of the operational amplifier 14, a signal proportional to the coil drive current is applied via resisters R5 and R2. The output signal (SIG3) is also applied to the negative input of a operational amplifier 15 via resisters R1, R3 and R10. Here, resisters R3 and R11 work as the feed-back resister to the operational amplifiers 14, 15, respectively.

To the positive input of the operational amplifier 15, a reference signal ($V_{REF}$) is applied as the reference input. These operational amplifiers comprise complimentary output circuits with the NPN transistor connected to the PNP transistor so that the current stabilizing characteristics of the output current can be obtained.

Now, the operation of the bias-magnetic-field generating system according to this invention, the structure of which has been mentioned above will be explained.

According to this system of the invention, the differential amplifying circuit 11 supplies the differential output (SIG3) depending on the input command signals (SIG1 and SIG2) which control the erasing and writing of the information. Suppose the resistance of $R_1$ and $R_2$, and $R_3$ and $R_4$ are the same i.e. $R_1=R_2$ and $R_3=R_4$ in the power amplifying circuit 13. Then, the coil current I is controlled by the power amplifying circuit or drive means 13 depending on the differential output V (SIG3) as shown in the following equation.

$$I = \frac{R_3}{(R_1 \times R_4)} \times V$$

FIG. 3 illustrates a time chart to explain the operation of the circuit shown in FIG. 2. Both of the erase command signal (SIG1) and the write command signal (SIG2) are TTL-leveled output signals from the controller and change their signal level in high e.g. 5 V, or low 0 V. The differential amplifying circuit 11 produces the differential output (SIG3) depending on the applied signal level of SIG 1 and SIG 2. Namely, the differential amplifying circuit 11 produces the positive output pulse (+V) when SIG 1 is low and SIG 2 is high, and produces the negative output (−V) pulse when SIG 1 is high and SIG 2 is low to the contrary. When both SIG 1 and SIG 2 are high or low, SIG 3 holds its zero level. Thus, the coil 16 can alter or reverse the direction of the bias-magnetic-field depending on the SIG 3 via the power amplifying circuit 13 to thereby selectively effect the writing and erasing of the information.

Furthermore, as the power amplifying circuit 13 works as the bridge type amplifier, the coil current I (SIG4) is automatically controlled to be proportional to the differential output (SIG3). Thus the coil 16 can generate controlled bias-magnetic-field in its strength or magnitude proportional to the differential output (SIG3).

It will be also appreciated to use the sensing device for detecting a coil temperature, for example, a thermister. In this case, the sensing device may supply the detected signal to the power amplifying circuit. Thereby, the power amplifying circuit may produce stabilized coil current by means of gain control in response to the coil temperature.

What is claimed is:

1. A bias-magnetic-field generating apparatus of a magneto-optical memory system for erasing and writing information on a magnetic recording medium according to an erase command signal and a write command signal, comprising:

differential amplifying circuit means having a first input supplied with the erase command signal and a second input supplied with the write command signal to produce a differential output signal;

constant current power amplifying circuit means connected to receive the differential output signal from said differential amplifying circuit means and for generating a stable drive current according to the differential output signal; and a bias-magnetic-field generating coil driven by the stable drive current fed from said constant current power amplifying circuit means so that a stable bias-magnetic-field is applied to said magnetic recording medium according to the differential output signal.

2. An apparatus according to claim 1; wherein said differential amplifying circuit means comprises at least one operational amplifier for receiving the erase command signal and the write command signal at input terminals thereof.

3. An apparatus according to claim 1; wherein said power amplifying circuit means comprises two operational amplifiers, resistors and the coil to define a bridge type power amplifier circuit for generating a constant drive current.

4. An apparatus according to claim 1; wherein said power amplifying circuit means comprises at least two operational amplifiers each having an NPN transistor and a PNP transistor to define a complementary output circuit.

5. An apparatus according to claim 1; wherein the write command signal and the erase command signal have a single polarity.

6. A method of generating a bias-magnetic-field in a magneto-optical memory system for erasing and writing information on a magnetic recording medium according to an erase command input signal and a write command input signal, comprising the steps of:

differentially processing the erase command input signal and the write command input signal to produce a differential output signal;

supplying said differential output signal to a power amplifying circuit means to produce a constant current according to the differential output signal; and supplying said constant current to a coil provided in the power amplifying circuit to generate a stable bias-magnetic-field with a polarity according to said erase and write command input signals.

* * * * *